(12) United States Patent
Muren et al.

(10) Patent No.: US 10,995,993 B2
(45) Date of Patent: May 4, 2021

(54) THERMAL RECUPERATION METHODS, SYSTEMS, AND DEVICES

(71) Applicant: Rebound Technologies, Inc., Denver, CO (US)

(72) Inventors: Russell Muren, Denver, CO (US); Luke Erickson, Denver, CO (US)

(73) Assignee: Rebound Technologies, Inc., Commerce City, CO (US)

( * ) Notice: Subject to any disclaimer, the term of this patent is extended or adjusted under 35 U.S.C. 154(b) by 222 days.

(21) Appl. No.: 14/865,727

(22) Filed: Sep. 25, 2015

(65) Prior Publication Data

US 2016/0187065 A1     Jun. 30, 2016

Related U.S. Application Data

(60) Provisional application No. 62/056,519, filed on Sep. 27, 2014.

(51) Int. Cl.
| | | |
|---|---|---|
| *F28C 3/00* | (2006.01) | |
| *F28D 20/00* | (2006.01) | |
| *F28D 7/00* | (2006.01) | |

(52) U.S. Cl.
CPC ............ *F28C 3/005* (2013.01); *F28D 7/0008* (2013.01); *F28D 20/0056* (2013.01); *F28D 2020/0069* (2013.01); *Y02E 60/14* (2013.01)

(58) Field of Classification Search
CPC ............. F28C 3/005; F28D 2020/0069; F28D 20/0056; F28D 7/0008; Y02E 60/142
See application file for complete search history.

(56) References Cited

U.S. PATENT DOCUMENTS

| | | | | |
|---|---|---|---|---|
| 2,089,886 | A | * | 8/1937 | Friedrich .................. F25D 3/04 62/185 |
| 2,590,269 | A | | 3/1952 | Pike |
| 2,715,945 | A | | 8/1955 | Hankison |

(Continued)

FOREIGN PATENT DOCUMENTS

| | | |
|---|---|---|
| JP | H-1252838 | 10/1989 |
| JP | H11-108298 | 4/1999 |

(Continued)

OTHER PUBLICATIONS

International Search Report and Written Opinion for PCT/US2015/052521, dated Dec. 14, 2015, ISA/US.

(Continued)

*Primary Examiner* — Devon Russell
(74) *Attorney, Agent, or Firm* — Wilson Patent Law, LLC

(57) ABSTRACT

Thermal recuperation methods, systems, and devices are provided. The methods, systems, and/or devices may provide for: introducing a first fluid into at least a portion of a tank containing a solid; exchanging heat between the solid contained within the tank and the first fluid as the first fluid passes at least around or through the solid; extracting the heated first fluid from at least the portion of the tank containing the solid; and/or passing the heated first fluid with respect to a heat exchanger thermally coupled with a second fluid. The heated first fluid may be cooled as it passes with respect to the heat exchanger and heat may be thermally recuperated between the solid and the second fluid.

7 Claims, 15 Drawing Sheets

(56) References Cited

U.S. PATENT DOCUMENTS

| | | | |
|---|---|---|---|
| 3,146,606 A * | 9/1964 | Grimes | F25C 1/08 62/233 |
| 3,247,678 A | 4/1966 | Mohlman | |
| 3,257,818 A | 6/1966 | Papapanu | |
| 3,398,543 A | 8/1968 | Leroy | |
| 3,747,333 A | 7/1973 | Gertsmann | |
| 3,879,956 A | 4/1975 | Ganiaris | |
| 4,471,630 A | 9/1984 | Sugimoto | |
| 4,539,076 A | 9/1985 | Swain | |
| 4,584,843 A | 4/1986 | Pronger | |
| 4,809,513 A | 3/1989 | Goldstein | |
| 4,822,391 A | 4/1989 | Rockenfeller | |
| 4,907,415 A | 3/1990 | Stewart | |
| 5,055,185 A | 10/1991 | McMurphy | |
| 5,207,075 A | 5/1993 | Gundlach | |
| 5,255,526 A | 10/1993 | Fischer | |
| 5,632,148 A | 5/1997 | Bronicki et al. | |
| 5,678,626 A | 10/1997 | Gilles | |
| 5,941,089 A | 8/1999 | Takaishi | |
| 6,012,298 A | 1/2000 | Goldstein | |
| 6,038,876 A | 3/2000 | Lang | |
| 6,253,116 B1 | 6/2001 | Zhang | |
| 9,310,140 B2 | 4/2016 | Muren | |
| 9,360,242 B2 | 6/2016 | Muren | |
| 9,885,524 B2 | 2/2018 | Muren | |
| 10,584,904 B2 | 3/2020 | Goldfarbmuren | |
| 2003/0066906 A1 | 4/2003 | Krause | |
| 2005/0095476 A1 | 5/2005 | Schrooten | |
| 2006/0141331 A1 | 6/2006 | Reiser | |
| 2007/0062853 A1 | 3/2007 | Spani | |
| 2007/0134526 A1 | 6/2007 | Numao | |
| 2007/0137223 A1 | 6/2007 | Brekke | |
| 2008/0142166 A1 | 6/2008 | Carson | |
| 2009/0019861 A1 | 1/2009 | Heckt | |
| 2009/0044935 A1 | 2/2009 | Nutsos | |
| 2009/0293507 A1 | 5/2009 | Narayanamurthy | |
| 2009/0312851 A1 | 12/2009 | Mishra | |
| 2010/0145114 A1 | 6/2010 | Abhari | |
| 2010/0206812 A1 | 8/2010 | Woods | |
| 2010/0218542 A1 * | 9/2010 | McCollough | F25C 5/005 62/345 |
| 2010/0218917 A1 | 9/2010 | Barnwell | |
| 2010/0281907 A1 | 11/2010 | Giertz | |
| 2010/0310954 A1 | 12/2010 | Odgaard | |
| 2011/0023505 A1 | 2/2011 | Popov | |
| 2012/0103005 A1 | 5/2012 | Kopko | |
| 2012/0193067 A1 | 8/2012 | Miller | |
| 2013/0199753 A1 | 8/2013 | Muren | |
| 2013/0227983 A1 * | 9/2013 | Jeong | F25D 23/061 62/285 |
| 2013/0327407 A1 | 12/2013 | Hermann | |
| 2014/0102662 A1 * | 4/2014 | Grama | C09K 5/063 165/10 |
| 2014/0102672 A1 * | 4/2014 | Campbell | H05K 7/20836 165/104.33 |
| 2015/0114019 A1 | 4/2015 | Van Gysel | |
| 2016/0290735 A1 | 4/2016 | Muren | |
| 2018/0242477 A1 | 9/2018 | Goldfarbmuren | |
| 2018/0283745 A1 | 10/2018 | Goldfarbmuren | |
| 2019/0137158 A1 | 5/2019 | Goldfarbmuren | |
| 2020/0318867 A1 | 10/2020 | Goldfarbmuren | |

FOREIGN PATENT DOCUMENTS

| | | |
|---|---|---|
| WO | WO2009070728 | 6/2009 |
| WO | WO2011162669 | 12/2011 |
| WO | 6/02012036166 | 3/2012 |
| WO | WO2014100330 | 6/2014 |
| WO | WO2014111012 | 7/2014 |
| WO | WO2014191230 | 12/2014 |
| WO | WO2016049612 | 3/2016 |
| WO | WO2017165378 | 9/2017 |
| WO | WO2018183238 | 4/2018 |
| WO | WO2019165328 | 8/2019 |
| WO | WO2020132467 | 6/2020 |

OTHER PUBLICATIONS

Jonathan Nicholls, Thermal Approach to Grid Energy Storage, Oregon Future Energy Conference, Apr. 26, 2012, available at http://ns2.thesegurogroup.com/event/images/stories/PDFs/4b_nicholls.pdf.

Sadao Nishimura, Ultra Eco-Ice System, Feb. 3, 2014, available at http://www.atmo.org/media.presentation.php?id=371.

Non-Final Office Action, U.S. Appl. No. 13/761,463, dated Aug. 20, 2015, USPTO.

Notice of Allowance, U.S. Appl. No. 13/761,463, dated Jan. 13, 2016, USPTO.

Notice of Allowance, U.S. Appl. No. 14/280,080, dated Mar. 28, 2016, USPTO.

Notice of Allowance, U.S. Appl. No. 15/090,756, dated Aug. 21, 2017, USPTO.

International Search Report and Written Opinion, PCT/US2017/023356, dated Jun. 6, 2017, USPTO.

Extended European Search Report, European Appl. No. 15844161.8, European Patent Office, dated Apr. 26, 2018.

Notice of Allowance, U.S. Appl. No. 15/935,005, USPTO, dated Oct. 8, 2019.

Examination Report, European Appl. No. 15 844 161.8, EPO, dated Mar. 13, 2019.

Office Action, Japanese Appl. No. JP 2016-576018, JPO, dated Jul. 29, 2019.

Non-Final Office Action, U.S. Appl. No. 15/855,048, USPTO, dated Jun. 10, 2019.

International Search Report and Written Opinion, International Appl. No. PCT/US2019/019323, USPTO—ISA, dated Feb. 23, 2019.

International Search Report and Written Opinion, International Appl. No. PCT/US2018/024436, USPTO-dated Mar. 27, 2018.

International Search Report and Written Opinion, International Appl. No. PCT/US2017/023356, USPTO—ISA, dated Mar. 21, 2017.

Intention to Grant, European Appl. No. 15844161.8, European Patent Office, dated Sep. 30, 2019.

International Search Report and Written Opinion, Int'l Appl. No. PCT/US2019/067892, dated Feb. 20, 2020, USPTO—ISA.

Final Office Action, U.S. Appl. No. 15/855,048, dated Feb. 27, 2020, USPTO.

Restriction Requirement, U.S. Appl. No. 15/935,005, dated Jun. 20, 2019, USPTO.

Notice of Allowance, U.S. Appl. No. 16/813,023, dated Oct. 27, 2020, USPTO.

Office Action, Chinese Appl. No. 201880035102.3, dated Jul. 16, 2020, CNIPA.

Extended European Search Report and Search Opinion, European Appl. No. 18777347.8, dated Nov. 18, 2020, EPO.

Restriction Requirement, U.S. Appl. No. 15/855,048, dated Mar. 8, 2019, USPTO.

Advisory Action, U.S. Appl. No. 151855,048, dated Jun. 9, 2020, USPTO.

Notice of Panel Decision from Pre-Appeal Brief Review, U.S. Appl. No. 15/855,048, dated Oct. 5, 2020, USPTO.

Extended European Search Report and Search Opinion, European Appl. No. 15844161.8, dated Apr. 26, 2018, EPO.

Decision to Grant a Patent, Japanese Appl. No. JP 2016-576018, dated Jun. 30, 2020, JPO.

Non-Final Office Action, U.S. Appl. No. 16/136,452, dated Apr. 22, 2020, USPTO.

Final Office Action, U.S. Appl. No. 16/136,452, dated Dec. 21, 2020, USPTO.

Extended European Search Report and Search Opinion, European Appl. No. 17770960.7, dated Oct. 30, 2019, EPO.

(56) References Cited

OTHER PUBLICATIONS

Rebound Technologies, "Lab notebook: icepoint™ is ready to keep your ice cream cold," dated Jan. 20, 2015, https://www.rebound-tech.com\lab-notebook-icepoint-is-ready-to-keep-your-ice-cream-cold/ (last visited Jan. 26, 2021).

\* cited by examiner

THERMAL RECUPERATION METHODS, SYSTEMS, AND DEVICES

CROSS-REFERENCES TO RELATED APPLICATIONS

This application is a non-provisional patent application claiming priority benefit of U.S. provisional patent application Ser. No. 62/056,519, filed on Sep. 27, 2014 and entitled "METHODS, SYSTEMS, AND DEVICES FOR THERMAL RECUPERATION," the entire disclosure of which is herein incorporated by reference for all purposes.

GOVERNMENT LICENSE RIGHTS

This invention was made with Government support under SBIR phase I award #1345502 awarded by the National Science Foundation. The Government has certain rights in this invention.

BACKGROUND

Heat transfer between different materials may be performed in a variety of ways. Heat exchangers, for example, may be utilized to transfer heat between one or more fluids. Heat exchangers may be utilized in a wide variety of technologies such as space heating, refrigeration, and air conditioning. A recuperator may provide a specific type of heat exchanger that may facilitate heat transfer inside a system to increase efficiency, for example.

While some technologies may have the ability to move heat around, such as heat exchangers, there may be a general need for new tools and techniques to recuperate heat.

SUMMARY

Methods, systems, and devices for thermal recuperation are provided. For example, a method of thermally recuperating heat is provided. The method may include: introducing a first fluid into at least a portion of a tank containing a solid; exchanging heat between the solid contained within the tank and the first fluid as the first fluid passes at least around or through the solid; extracting the heated first fluid from at least the portion of the tank containing the solid; and/or passing the heated first fluid with respect to a heat exchanger thermally coupled with a second fluid. The heated first fluid may be cooled as it passes with respect to the heat exchanger and heat may be thermally recuperated between the solid and the second fluid.

The method may include recirculating the cooled first fluid through the tank after it has passed with respect to the heat exchanger. The method may include moving at least a portion of the solid through a lower portion of the tank after the first fluid has passed at least around or through the solid. Moving at least the portion of the solid through the lower portion of the tank may utilize gravity. The method may include combining the portion of the solid with a freeze point suppressant to produce the second fluid after moving at least the portion of the solid through the lower portion of the tank.

In some examples of the method, introducing the first fluid into the tank containing the solid includes utilizing one or more vertically-oriented injectors. The method may further include utilizing at least a pump, a compressor, or a blower to facilitate at least the introducing or the extracting in some cases.

In some examples of the method, introducing the first fluid into the tank containing the solid includes utilizing the heat exchanger to generate buoyancy forces with respect to the first fluid. The method may further include utilizing one or more dividers within the tank to separate the solid from the heat exchanger.

In some examples of the method, the first fluid includes an inert fluid. The inert fluid may include at least an inert liquid or an inert gas. The inert fluid may include at least water, synthetic oil, natural oil, air, nitrogen, argon, and/or carbon dioxide in some cases. The solid may include in general a phase-transitioned material. The first fluid may include air and the solid may include ice, for example. The second fluid may include at least a portion of a combined freeze point suppressant and the phase-transitioned material.

A system for thermally recuperating heat is provided. The system may include: a tank configured to hold a solid; a first fluid introducer configured to facilitate the introduction of the first fluid into at least a portion of the tank configured to hold the solid such that the first fluid passes at least around or through the solid and exchanges heat with the solid; and/or a heat exchanger configured to: couple with the tank such the heated first fluid is cooled as it passes with respect to the heat exchanger; and/or couple thermally with a second fluid, where heat is thermally recuperated between the solid and the second fluid.

The fluid introducer may be configured to couple with the tank such that at least a portion of the solid moves through a lower portion of the tank at least as or after the first fluid passes at least around or through the solid. The fluid introducer may be further configured such that at least the portion of the solid moves through the lower portion of the tank utilizing gravity. In some examples of the system, the fluid introducer includes one or more vertical injectors. The system may include at least a pump, a compressor, or a blower coupled with the fluid introducer, which may facilitate moving the first fluid through at least a portion of the tank.

In some examples of the system, the heat exchanger may be positioned with respect to the tank to generate buoyancy forces with respect to the first fluid. The fluid introducer may include one or more dividers configured to separate the solid from the heat exchanger in some cases.

In some examples of the system, the first fluid includes an inert fluid. The inert fluid may include at least an inert liquid or an inert gas. The inert fluid may include at least water, synthetic oil, natural oil, air, nitrogen, argon, and/or carbon dioxide in some cases. The solid may include a phase-transitioned material. In some examples, the first fluid may include air and the solid may include ice, for example. In some examples of the system, the second fluid includes at least a portion of a combined freeze point suppressant and the phase-transitioned material.

In some examples of the system, the tank may be further configured to combine at least a portion of the solid with a freeze point suppressant after moving at least the portion of the solid through the lower portion of the tank. The second fluid may be obtained, in some cases, from the combined freeze point suppressant and the phase-transitioned material.

A device for thermally recuperating heat is provided. The device may include: means for introducing a first fluid into a tank configured to hold a solid such that the first fluid passes at least around or through the solid and exchanges heat with the solid; and/or means for cooling the heated fluid utilizing a second fluid, wherein heat is recuperated between the solid and the second fluid.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different examples may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
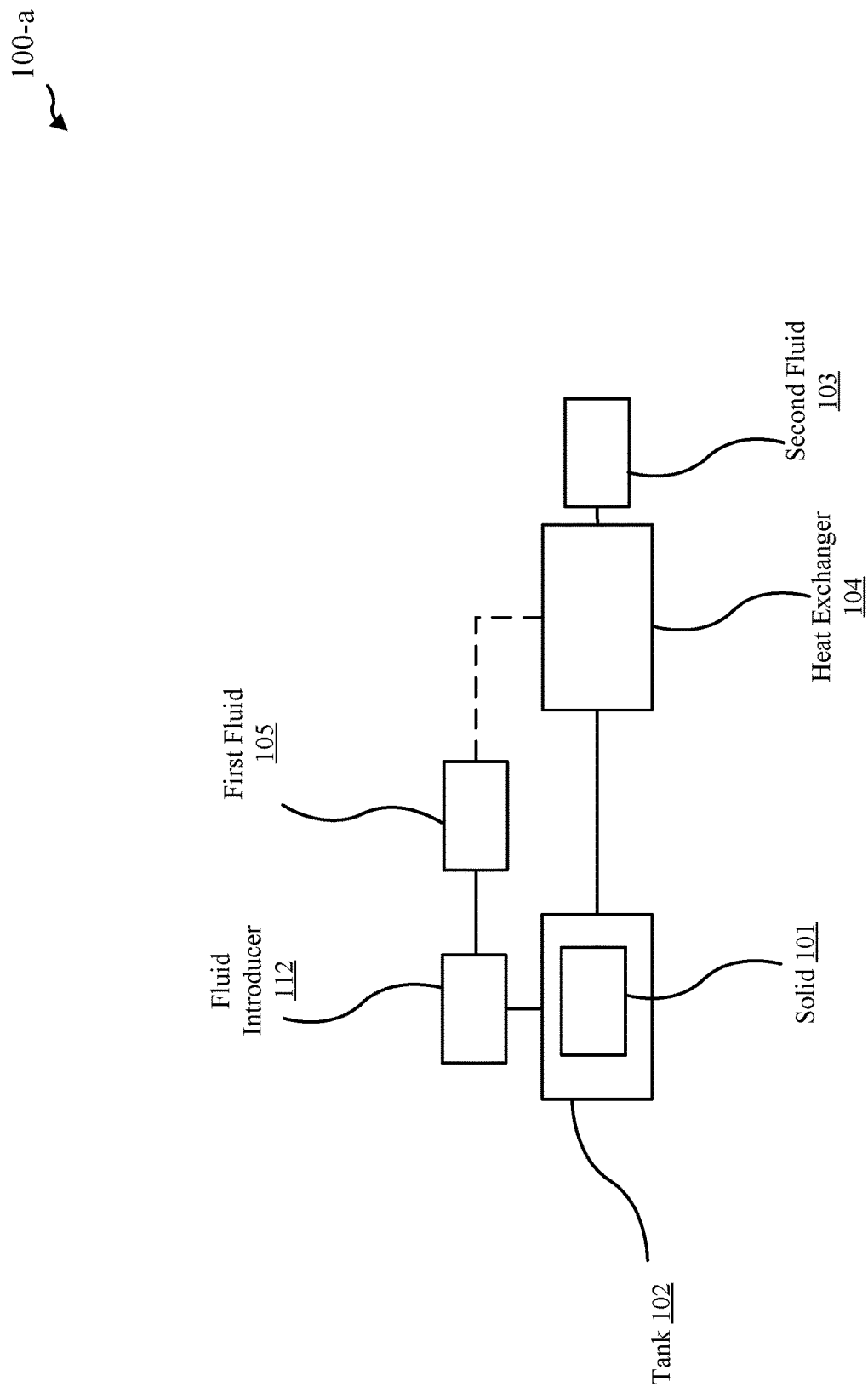
FIG. 1A shows a system for thermal recuperation in accordance with various embodiments.

This description provides examples, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, methods, and devices may individually or collectively be components of a larger system, wherein other procedures may take precedence over or otherwise modify their application.

Tools and techniques for thermally recuperating heat are provided. Heat may be thermally recuperated between a solid and a fluid. For example, thermally recuperated heat may be from a cold fluid to a warmer packed bed of solid. The methods, systems, and/or devices may work using two or more heat transfer processes, which may be coupled thermally by an inert intermediate fluid, for example. The use of an inert intermediate fluid in some cases may allow for heat to be transferred between two reactive materials, while simultaneously allowing for a direct contact heat transfer process on the solid side of the heat exchanger. The two reactive materials may include a solid material and another fluid material, which may be referred to as a second fluid in some cases.

In some cases, the methods, systems, and/or devices may allow for reactive materials to be thermally coupled while enabling one or more of the materials to be a solid, which may perform poorly in traditional indirect heat exchangers. The use of an inert fluid in some cases may lead to smaller equipment size and better heat transfer on the solid side of the system. The methods, systems, and/or devices may allow heat to be transferred between two materials where one or more of the materials may be a solid in a packed random bed that may not easily be thermally accessed by conventional heat exchangers.

Some examples may utilize multiple heat exchanges, such as two heat exchange aspects, that may be coupled by an inert fluid. Heat may initially start in the side of a system that is solid. Heat may be extracted from this solid by a circulating inert fluid, for example. This fluid may be chosen specifically such that it may not react with the solid. Heat may be extracted from the inert fluid by a second heat exchanger and may be put into a second material that may be a liquid, gas, or second solid, for example.

In addition to using a fluid, such as an inert fluid, that may achieve higher heat transfer without unwanted inter-material reactions, the methods, systems, and/or devices may be designed such that the solid material moves through the device and/or system with the force of gravity and may not involve any other form of conveyance. This may be achieved in some cases through the heat exchanger surfaces or injectors being vertically oriented and the solid may be allowed to fall while the inert fluid may flow counter to the direction of gravity.

The use of vertical-centric designs in some cases may take the form of fluid injectors that may be suspended from the top of a tank, vertical injectors may be integrated into the side of the tank, and/or vertical heat exchanger surfaces may be integrated directly into the tank, for example, though other designs may also be utilized.

Turning now to FIG. 1A, a system 100-a for thermally recuperating heat is provided in accordance with various embodiments. The system 100-a may include a tank 102 configured to hold a solid 101. System 100-a may include a fluid introducer 112 that may be configured to facilitate the introduction of a first fluid 105 into at least a portion of the tank 102 configured to hold the solid 101 such that the first fluid 105 passes at least around or through the solid 101 and exchanges heat with the solid 101. System 100-a may include a heat exchanger 104 that may be configured to couple with the tank 102 such the heated first fluid 105 may be cooled as it passes with respect to the heat exchanger 104. The heat exchanger 104 may also be configured to couple thermally with a second fluid 103, where heat may be thermally recuperated between the solid 101 and the second fluid 103.

The fluid introducer 112 may be configured to couple with the tank 102 such at least a portion of the solid 101 moves through a lower portion of the tank 102 at least as or after the first fluid 105 passes at least around or through the solid 101. The fluid introducer 112 may be further configured such that at least the portion of the solid 101 moves through the lower portion of the tank 102 utilizing gravity. In some cases, the fluid introducer 112 may include one or more vertical injectors. System 100-a may include at least a pump, a compressor, or a blower coupled with the fluid introducer 112 to facilitate moving the first fluid 105 through at least a portion of the tank 102.

In some cases, heat exchanger 104 may be positioned with respect to the tank 102 to generate buoyancy forces with respect to the first fluid 105. The fluid introducer 112 may include one or more dividers configured to separate the solid 101 from the heat exchanger 104 in some cases.

In some cases, the first fluid 105 may include an inert fluid. The inert fluid may include at least an inert liquid or an inert gas. The inert fluid may include at least water, synthetic oil, natural oil, air, nitrogen, argon, and/or carbon dioxide in some cases.

In some cases, the solid 101 may include a phase-transitioned material. For example, the solid 101 may include ice as a phase-transitioned material. The solid 101 may be fully or partially solid. The solid 101 may also be referred to as a storage material in some cases. The term storage material may include a material that may be storing something, such as a material that may be storing the potential to heat something or the potential to cool something. The solid 101 may include a fully or partially solid form of the following, but is not limited to: water, an organic material, an ionic liquid, an inorganic material, or DMSO. In some examples, the first fluid 105 may include air and the solid 101 may include ice. The second fluid 103 may include at least a portion of a combined freeze point suppressant and the phase-transitioned material; the second fluid 103, for example, may include water, alcohols, solvated salts, a volatile organic compound, an ionic liquid, amines, $CO_2$, an inorganic liquid, DMSO, and/or a mixture of miscible materials. In some examples, the tank 102 may be further configured to combine at least a portion of the solid 101 with a freeze point suppressant to produce the second fluid 103 after moving at least the portion of the solid 101 through a lower portion of the tank 102. Combining at least the portion of the solid 101 with the freeze point suppressant may melt the solid 101. Moving the solid 101 through the lower portion of the tank 102 may include, but is not limited to, moving the solid 101 into the lower portion of the tank 102 or having the solid 101 exit the lower portion of the tank 102. In some cases, the solid 101 may exit the lower portion of the tank 102 after it may have melted. The lower portion of the tank 102 may include a portion of the tank below a point where the first fluid 105 may start to be introduced into the portion of the tank 102 that may contain the solid 101. In some examples, the lower portion of the tank 102 may include at least the bottom one percent, the bottom five percent, or the bottom ten percent of the tank 102. In some cases, the lower portion of the tank 102 may include at least the bottom half or bottom quarter portion of the tank 102.

Aspects of system 100-a may provide means for introducing first fluid 105 into the tank 102 configured to hold a solid 101 such that the first fluid 105 passes at least around or through the solid 101 and exchanges heat with the solid 101. For example, the fluid introducer 112 may provide this means. Systems 100-a may provide means for cooling the heated first fluid 105 utilizing a second fluid 103, wherein heat is recuperated between the solid 101 and the second fluid 103. For example, heat exchanger 104 may provide this means.

Figure 1B:
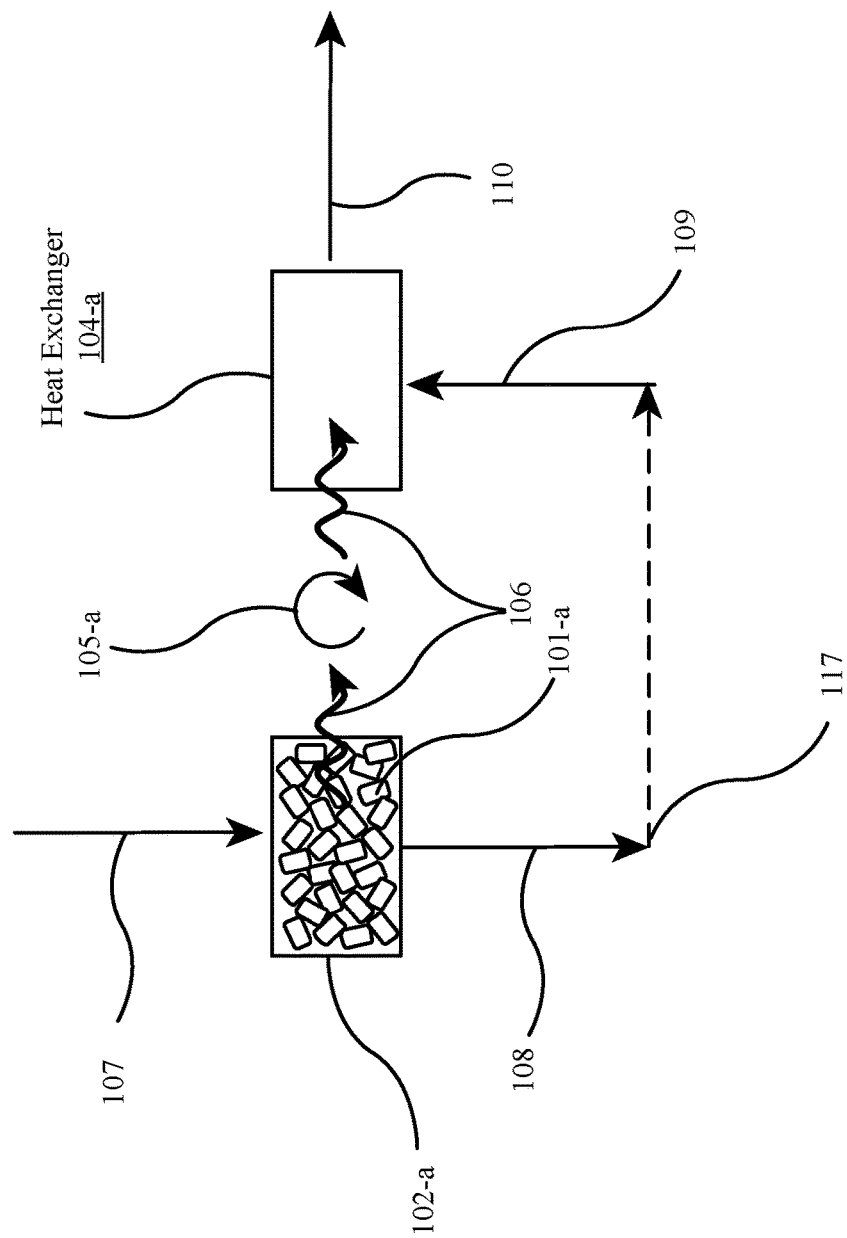
FIG. 1B shows a system for thermal recuperation in accordance with various embodiments.

FIG. 1B shows a system 100-b for thermally recuperating heat in accordance with various embodiments. System 100-b may be an example of system 100-a of FIG. 1A. System 100-b may include a tank 102-a, which may be responsible for holding a packed bed of solid 101-a. Heat 106 may extracted from that tank 102-a via fluid 105-a, which may be a circulating inert fluid, for example. Fluid 105-a may be referred to as a first fluid. Heat 106 may be extracted by a heat exchanger 104-a, such that the fluid 105-a can circulate continuously. This thermal connection may create a solid-fluid heat exchanger where a warm solid 107 may enter the system 100-b and/or tank 102-a and may leave and/or result as a colder solid 108. Cold fluid 109, which may be referred to as a second fluid (such as the second fluid 103 of FIG. 1A) in some cases, may enter the system 100-b and/or heat exchanger 104-a and may leave as a warmer fluid 110.

Merely by way of example, in a system that may use air as the first fluid and ice as the solid, the temperature of the solid entering the tank may be around 0° C. and the first fluid entering the tank may be −30° C. After the thermal interaction, the first fluid may exit the tank at around −10° C. and the solid may exit the tank at around −20° C. Other temperatures and ranges may be utilized.

In some cases, solid 101-a in the tank 102-a may flow by gravity without moving parts. This may be possible because the solid 101-a may be removed at a set rate from the bottom of the tank 102-a or consumed in a chemical or thermal process at the bottom of the tank 102-a and removed as a product of that process, for example.

In some cases, the fluid 105-a may be any fluid that may not interact with the solid 101-a. This may include inert fluids in general. For example, the inert fluid may include a liquid, such as water, synthetic oil, natural oil, or other material, or a gas such as air, nitrogen, argon, carbon dioxide, merely by way of example. In one example, the inert fluid 105-a may include air and the solid 101-a may include ice.

In some cases, the colder solid 108 may be combined 117 with a freeze point suppressant, from which the cold fluid 109 may be produced and may then be utilized with respect to heat exchanger 104-a. The freeze point suppressant may be added using one or more inlet ports in the tank 102-a. Combining the freeze point suppressant and solid may be accomplished by inducing a flow of the freeze point suppressant over, around, or through the solid, such as by placing the one or more inlets and one or more outlets on different or opposite sides of the tank 102-a and/or by introducing tank geometry to force a flow path. Combining also may be achieved mechanically in some cases. Combining at least the portion of the solid 108 with the freeze point suppressant may melt the solid 108. In some cases, this mixing may occur within a bottom portion of the tank 102-*a*, though in some cases, the mixing may occur after the colder solid 108 has left the bottom portion of the tank 102-*a*. Both cases may be referred to as when at least a portion of the colder solid 108 may be moved through a lower portion of the tank 102-*a*. The freeze point suppressant may include a pure or mixed material that may chemically suppresses the freeze point of the solid. This material may include, but is not limited to: water, ammonia, a salt, a non-salt soluble solid, an organic liquid, an inorganic liquid, a mixture of miscible materials, and/or a surfactant-stabilized mixture of immiscible materials.

Figure 2:
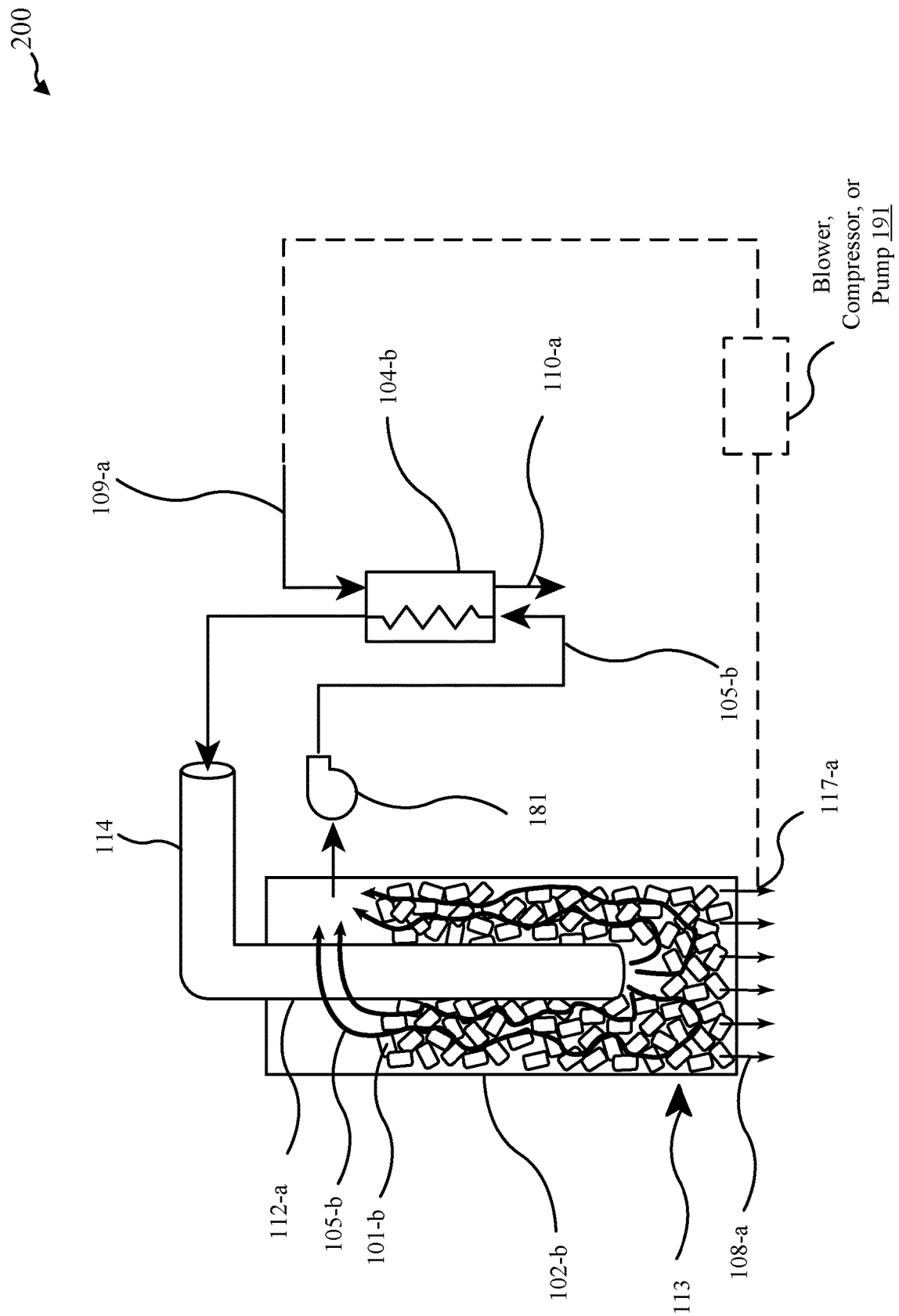
FIG. 2 shows a system for thermal recuperation in accordance with various embodiments.

System 200 of FIG. 2 shows an example of a system for thermally recuperating heat in accordance with various embodiments. System 200 may be an example of system 100-*a* of FIG. 1A and/or system 100-*b* of FIG. 1B. In system 200, a fluid 105-*b* may flow through solid 101-*b* in the tank 102-*b*. Fluid 105-*b* may be referred to as a first fluid. Fluid 105-*b* may include an inert fluid in some cases. The flow may be induced in the fluid 105-*b* by a pump, a compressor, or blower 181, for example, and may flow through a heat exchanger 104-*b*, which may be external to the tank 102-*b*. The fluid 105-*b* may flow through a header system 114 that may be designed such that the solid 101-*b* in the tank 102-*b* may not get hung up through using vertical injector 112-*a*; vertical injector 112-*a*, alone or in combination with header system 114, may be referred to as a fluid introducer in some cases. The fluid 105-*b* may be injected near the bottom or lower portion 113 of the tank 102-*b* and may flow through the packed bed of solid 101-*b*, exchanging heat with the solid 101-*b*. The solid 101-*b* that may leave the tank (see ref. num. 108-*a*) or may move towards the bottom of the tank 102-*b* may be near the temperature of the injected fluid 105-*b*. The fluid 105-*b* that may leave the tank 102-*b* may be removed from the top and may be near the temperature of the solid 101-*b* when the solid 101-*b* entered the tank 102-*b*. When the fluid 105-*a* may be cooled in the external heat exchanger 104-*b*, it may warm a second fluid from a cold temperature 109-*a* to a warmer temperature 110-*a*.

In some cases, the second fluid with the cold temperature 109-*a* may be produced from combining 117-*a* at least a portion of the solid 101-*b*, which may leave the tank 102-*b* or may move into the bottom of the tank 102-*b*, with a freeze point suppressant; both examples may be referred to as moving at least a portion of the solid 101-*b* through a lower portion of the tank 102-*b*. Tank 102-*b* may include one or more outlets from which the second fluid may be conveyed from the tank 102-*b*. In some configurations, at least the portion of the solid 101-*b* may leave the tank 102-*b* through the one or more outlets such that it may be combined with the freeze point suppressant to form the second fluid to be used with respect to heat exchanger 104-*b*. Combining at least the portion of the solid 101-*b* with the freeze point suppressant may melt the solid 101-*b*. In some cases, the one or more outlet ports may be utilized to convey the second fluid from the tank 102-*b* to the heat exchanger 104-*b* when the second fluid may be produced in the bottom of the tank 102-*b* after at least the portion of the solid 101-*b* may be combined with the freeze point suppressant. A blower, compressor, or pump 191 may be utilized to help convey the second fluid to the heat exchanger 104-*b*. In some cases, the outlet may include an opening through the bottom of the tank.

Figure 3A:
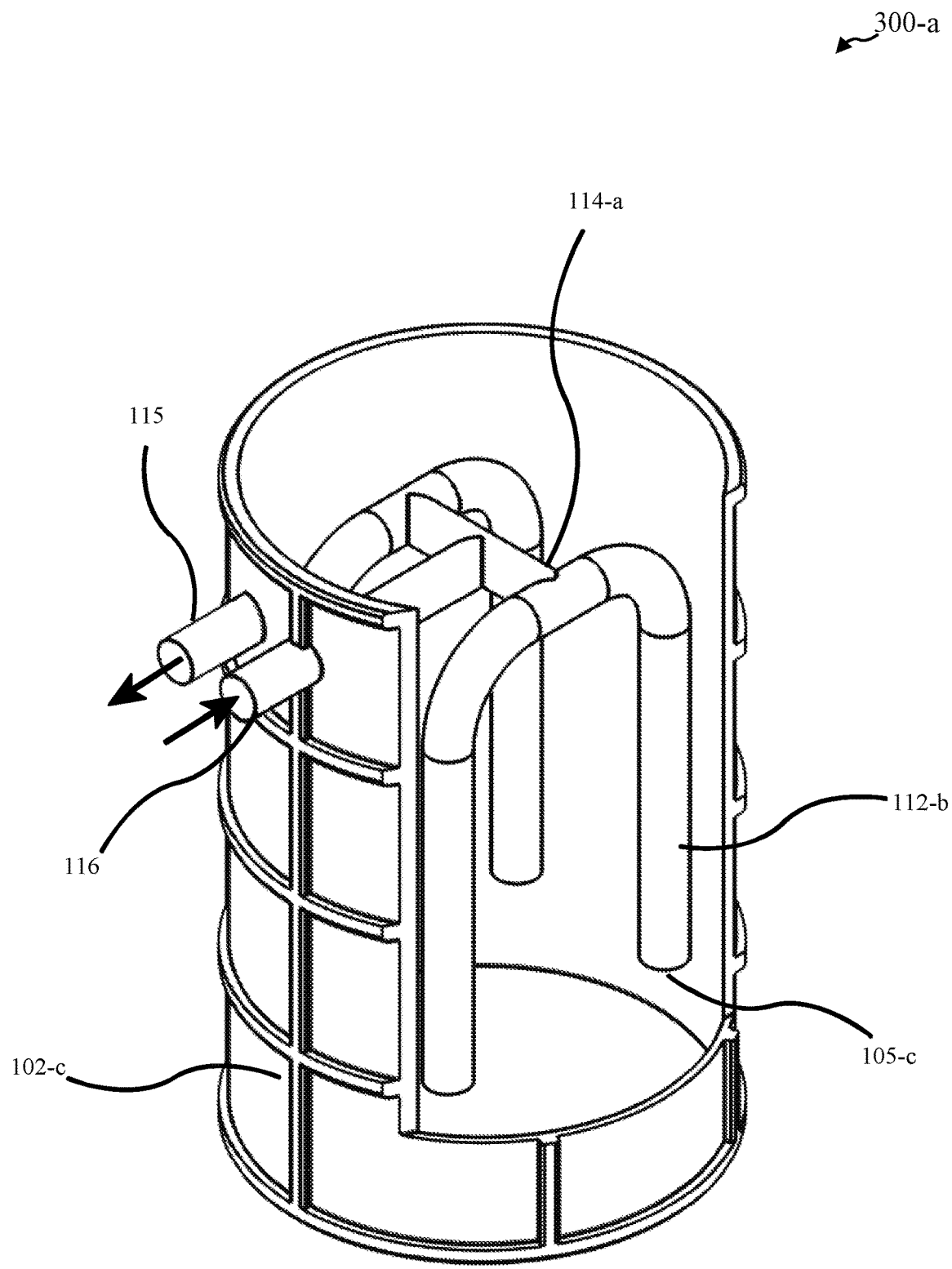
FIG. 3A shows a cutaway view of a system for thermal recuperation in accordance with various embodiments.

Turning now to FIG. 3A, system 300-*a* provides a tank configuration for thermal recuperation in accordance with various embodiments. System 300-*a* may provide for aspects of system 100-*a* of FIG. 1A, system 100-*b* of FIG. 1B, and/or system 200 of FIG. 2. In this example, a tank and fluid introducer are provided that may utilize a suspended manifold 114-*a* (which may also be referred to as a header) with vertical injector(s) 112-*b* that may reach to a desired level in the tank 102-*c* before injecting first fluid 105-*c*. For example, it may be desirable to inject the first fluid low in the tank to achieve more efficient counter flow heat transfer. In this example, four vertical injectors 112-*b* are shown, though other embodiments may include more or less injectors. This manifold 114-*a* may be installed inside a tank 102-*c* that has integrated inert fluid input port(s) 116 and/or output port(s) 115. The vertical injector(s) 112-*b*, alone or in combination with the suspended manifold 114-*a*, may be referred to as a fluid introducer in some cases.

Figure 3B:
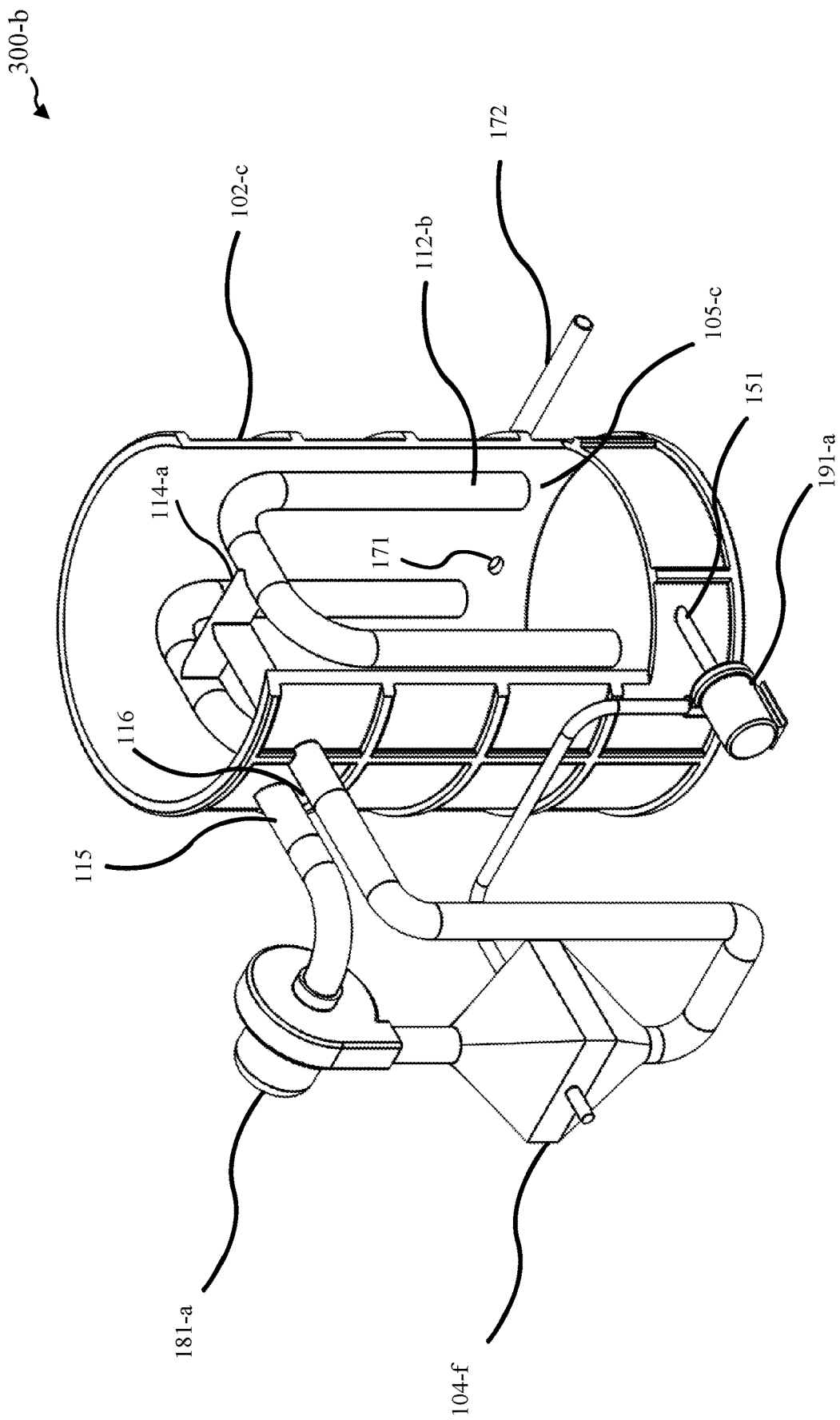
FIG. 3B shows a cutaway view of a system for thermal recuperation in accordance with various embodiments.

Turning now to FIG. 3B, system 300-*b* provides for thermal recuperation in accordance with various embodiments. System 300-*b* may provide for aspects of system 100-*a* of FIG. 1A, system 100-*b* of FIG. 1B, system 200 of FIG. 2, and/or system 300-*a* of FIG. 3A. System 300-*b* may utilize a tank and fluid introducer configuration as may also be shown in FIG. 3A, where the tank and fluid introducer are provided that may utilize a suspended manifold 114-*a* (which may also be referred to as a header) with vertical injector(s) 112-*b* that may reach to a desired level in the tank 102-*c* before injecting first fluid 105-*c*. For example, it may be desirable to inject the first fluid low in the tank to achieve more efficient counter flow heat transfer. In this example, as also discussed above with respect to system 300-*a* in FIG. 3A, four vertical injectors 112-*b* are shown, though other embodiments may include more or less injectors. This manifold 114-*a* may be installed inside a tank 102-*c* that has integrated inert fluid input port(s) 116 and/or output port(s) 115. The vertical injector(s) 112-*b*, alone or in combination with the suspended manifold 114-*a*, may be referred to as a fluid introducer in some cases.

Furthermore, system 300-*b* may include one or more outlet ports 151 that may be utilized to draw off a portion of a second fluid from the bottom of tank 102-*c*. Additionally, system 300-*b* may include one or more inlet ports 171, which may be utilized to facilitate the injection of a freeze point suppressant into the bottom of the tank 102-*c*. One or more pipes 172 may be used to facilitate delivering the freeze point suppressant to the one or more inlet ports 171. The freeze point suppressant may be combined with the solid to produce melting and the second fluid by way of mechanical or fluid mixing, for example. A blower, compressor, or pump 191-*a* (shown as a pump in this example) may be utilized to help convey the second fluid to heat exchanger 104-*f*. In this example, heat exchanger 104-*f* may be a cross-flow heat exchanger, though other types of heat exchangers may be utilized. A pump, compressor, or blower 181-*a* (shown as a blower in this example) may be utilized to help convey the first fluid through the heat exchanger 104-*f*, where the first fluid may be cooled, while the second fluid may be heated. Blower 181-*a* may also help facilitate moving the first fluid through the tank 102-*c* in some cases. The first fluid may then be recirculated through the tank 102-*c* through being introduced via input port(s) 116.

Figure 4:
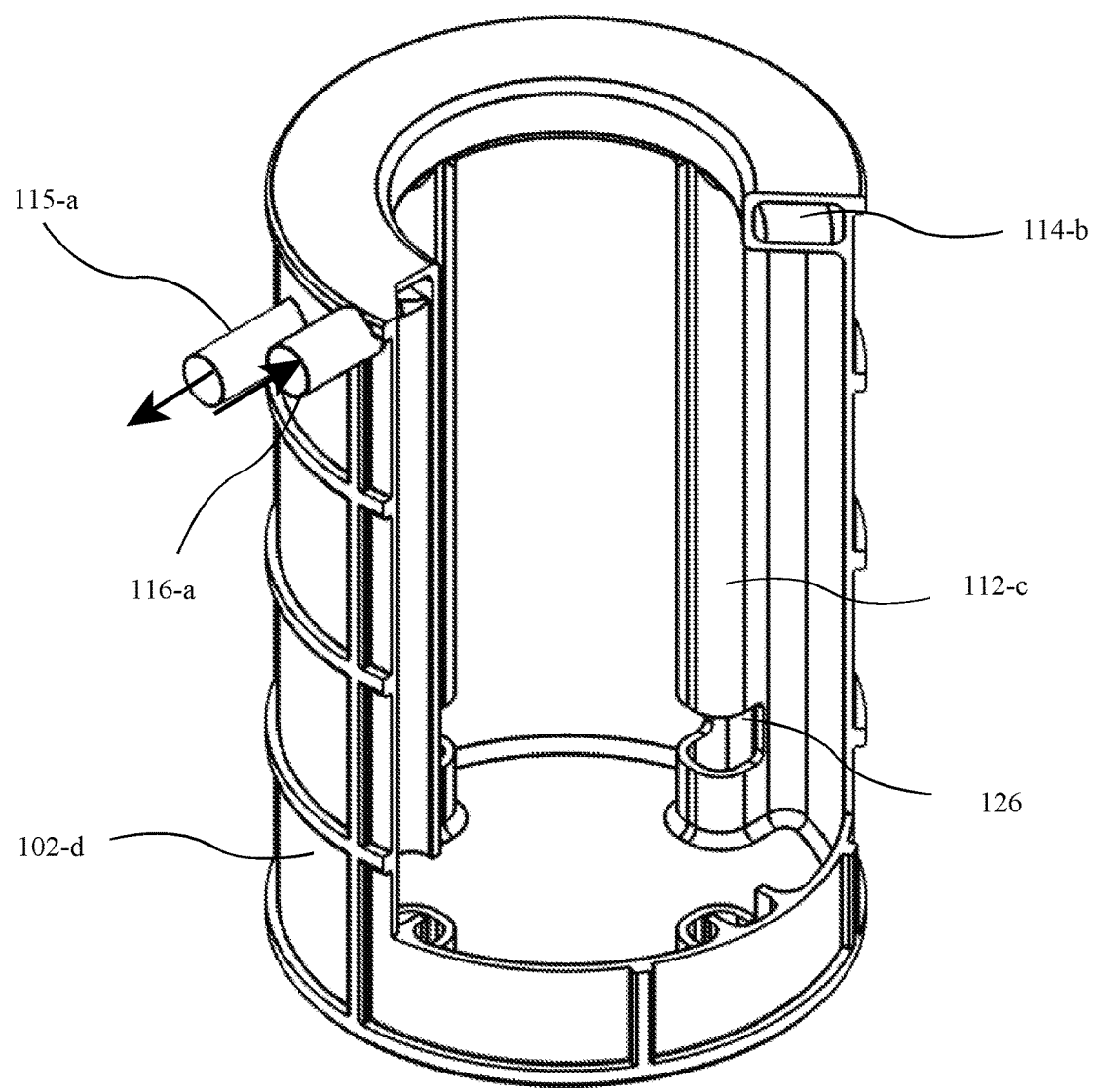
FIG. 4 shows a cutaway view of a system for thermal recuperation in accordance with various embodiments.

FIG. 4 shows another system 400 that includes a tank configuration for thermal recuperation in accordance with various embodiments. System 400 may provide an example of aspects of system 100-*a* of FIG. 1A, system 100-*b* of FIG. 1B, and/or system 200 of FIG. 2, for example. System 400 may include one or more vertical injectors 112-*c* that may be fed by a manifold 114-*b* that may run down the tank 102-*d* to a level of injection 126. These features may be integrated directly into the tank 102-*d*. The tank 102-*b* may also have fluid inlet port(s) 116-*a* and/or outlet port(s) 115-*a* that may be integrated into the tank 102-*d*. The vertical injector(s) 112-*c*, alone or in combination with the suspended manifold 114-*b*, may be referred to as a fluid introducer in some cases.

Figure 5:
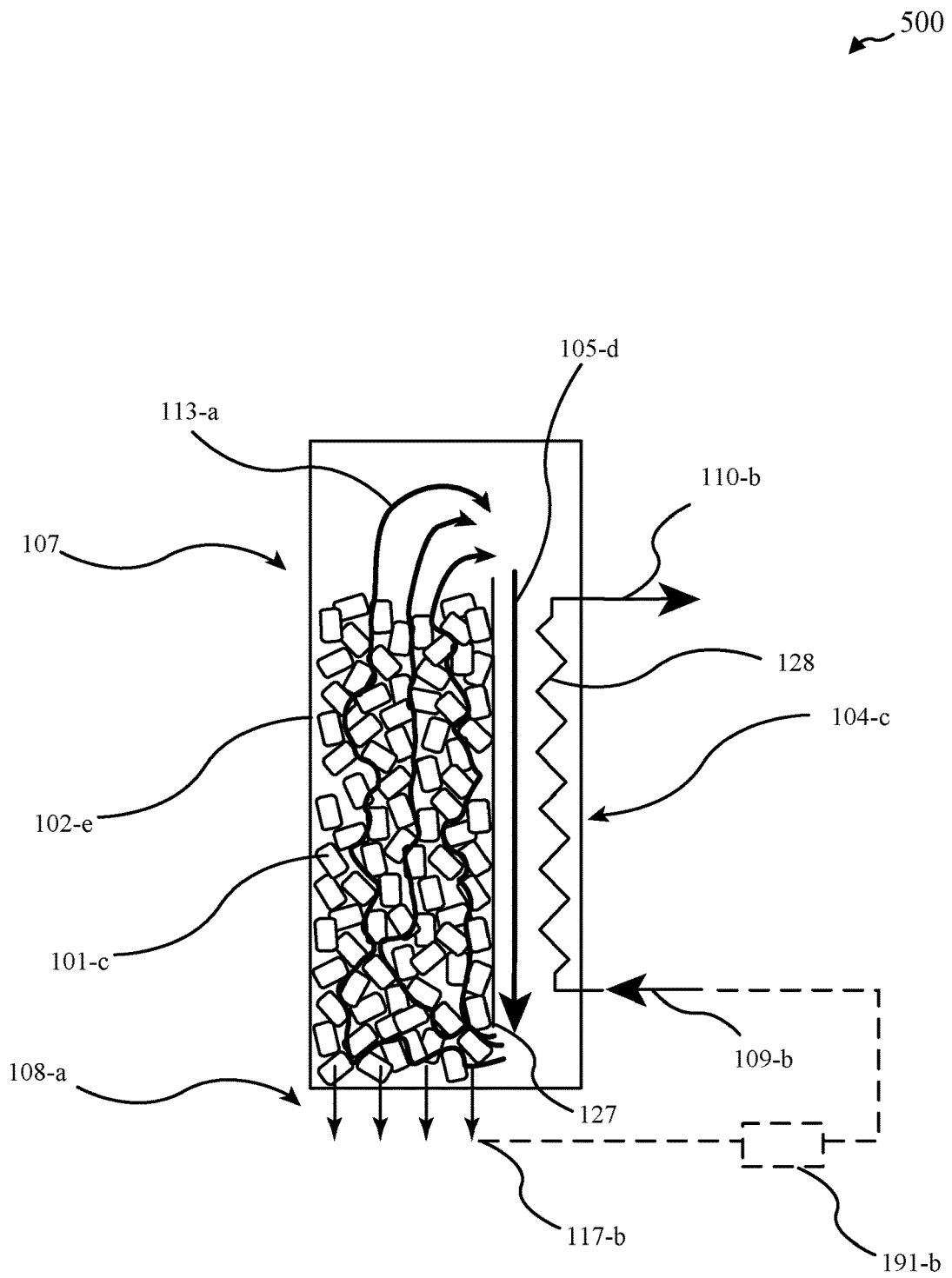
FIG. 5 shows a system for thermal recuperation in accordance with various embodiments.

FIG. 5 shows another system 500 for thermal recuperation in accordance to various embodiments. System 500 may provide an example of aspects of system 100-*a* of FIG. 1A, and/or system 100-*b* of FIG. 1B, for example. In this example, first fluid 105-*d* may flow naturally around and/or through solid 101-*c* in the tank 102-*e*. Fluid 105-*d* may include an inert fluid. The fluid flow may be induced in the fluid 105-*d* by buoyancy forces generated in a heat exchanger 104-*c*, which may be integrated directly into the tank 102-*e*; heat exchanger 104-*c* may include a natural convection element 128 in some cases. Cold fluid 109-*b* (which may be referred to as a second fluid) may flow upward cooling the first fluid 105-*d* and may exit as a warmer fluid 110-*b* at a higher temperature. In some cases, the cold fluid 109-*b* may be produced from combining or mixing 117-*b* at least a portion of the solid 101-*c*, which may leave the tank 102-*c* or may move into the bottom of the tank 102-*c*, with a freeze point suppressant; both examples may be referred to as moving at least a portion of the solid 101-*c* through a lower portion of the tank 102-*e*. The mixing 117-*b* of at least the portion of the solid 101-*c* with a freeze point suppressant may result in melting of the solid 101-*c*, which may thus result in the production of the second fluid, such as cold fluid 109-*b*. A blower, compressor, or pump 191-*b* may be utilized to help convey the second fluid 109-*b* through the heat exchanger 104-*c*.

The vertical orientation of system 500 may result in a flow 113-*a* of fluid 105-*d* in the packed bed where solid 101-*c* enters 107 at a warmer temperature and leaves 108-*b* at a colder temperature. The two sections of tank 102-*e* may be separated by a divider 127, which may allow both buoyancy processes to be carried out without mixing. Divider 127, alone or in combination with natural convection element 128, may be referred to as a fluid introducer in some cases.

Figure 6A:
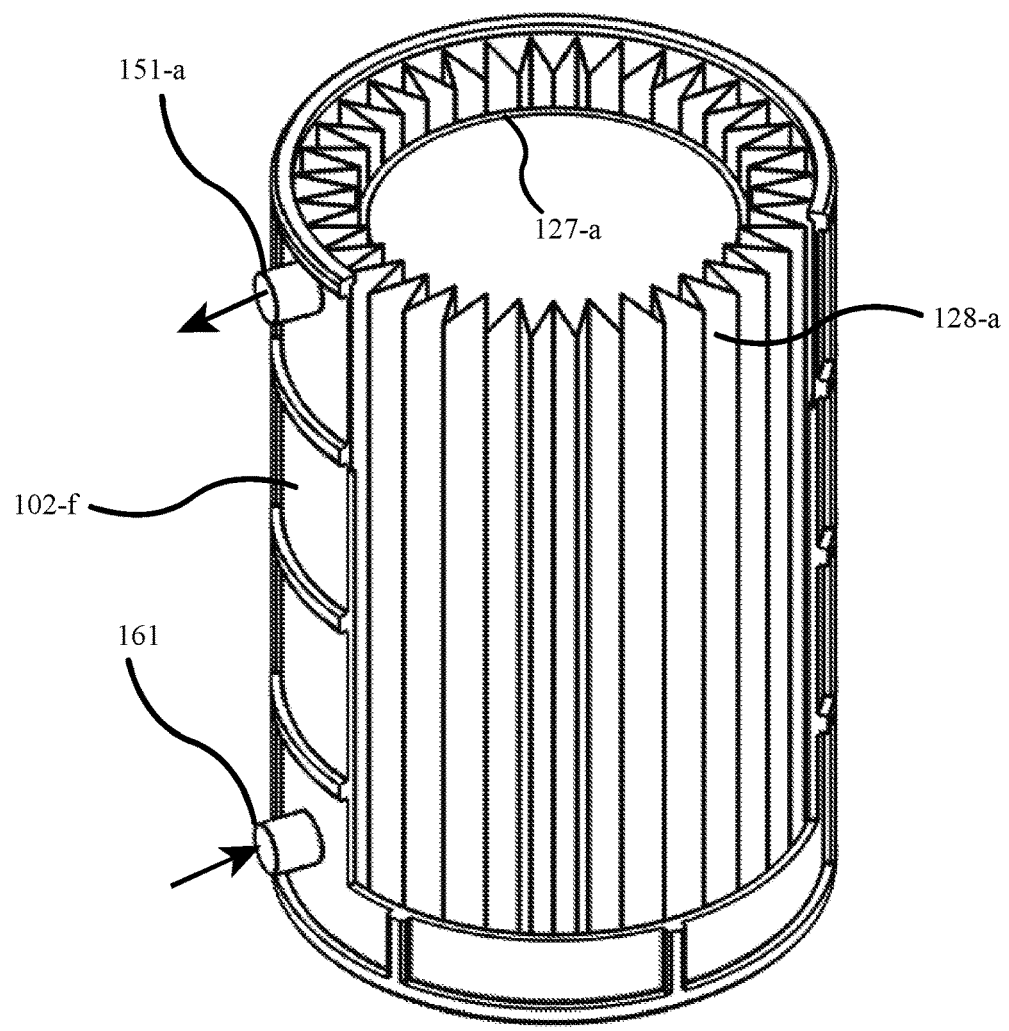
FIG. 6A shows a cutaway view of a system for thermal recuperation in accordance with various embodiments.
Figure 6B:
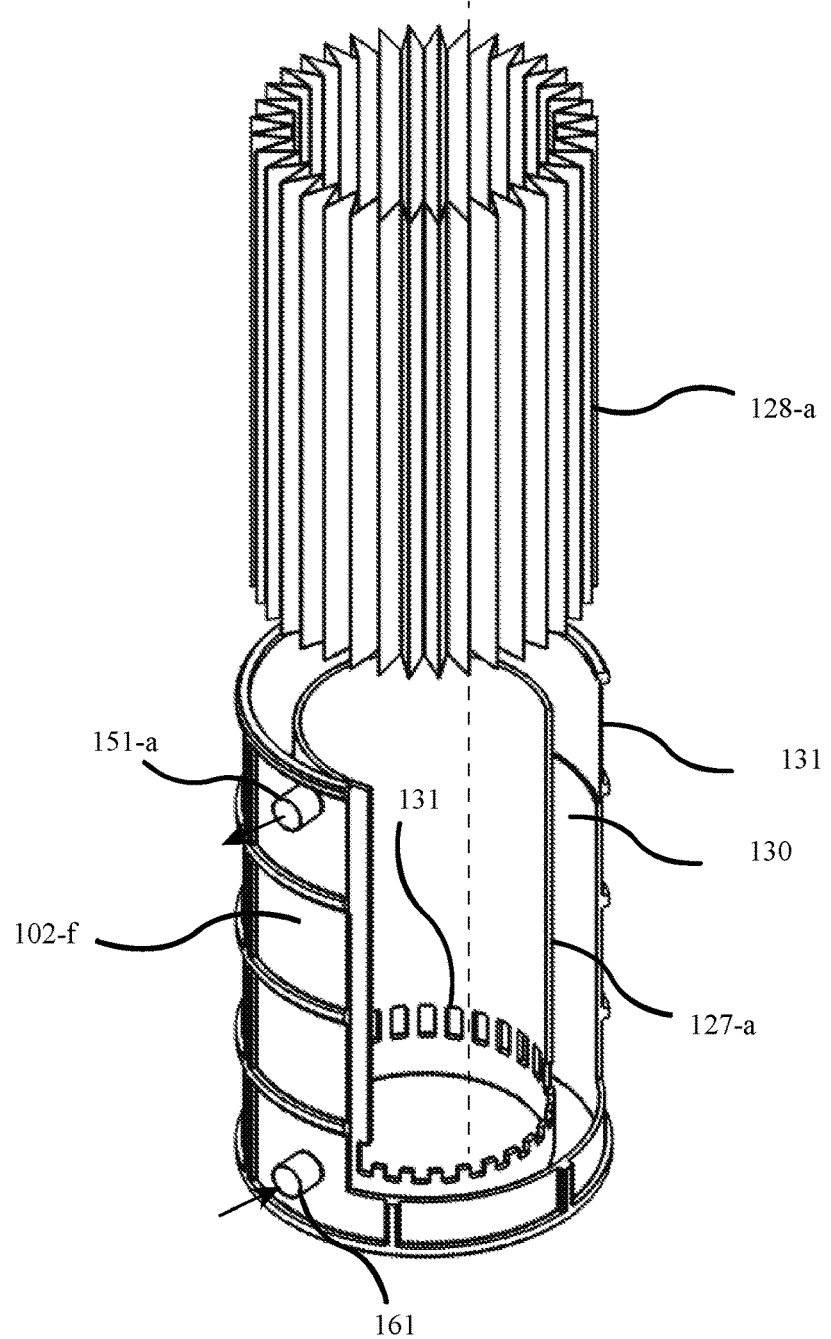
FIG. 6B shows a cutaway view of a system for thermal recuperation in accordance with various embodiments.

System 600-*a* of FIG. 6A reflects another system for thermal recuperation in accordance with various embodiments. System 600-*a* may provide aspects of system 100-*a* of FIG. 1A, system 100-*b* of FIG. 1B, and/or system 500 of FIG. 5, for example. System 600-*a* may include a tank 102-*f* that may include an integrated fluid inlet port(s) 161 and/or outlet port(s) 151-*a*. An internal divider 127-*a* may separate the packed solid from a natural convection element 128-*a*. The natural convection element 128-*a* may be configured with an increased surface area, such as the corrugated or zigzag shape as shown in FIG. 6A, though other configurations to increase surface area may also be utilized. The natural convection element 128-*a* may separate a second fluid on the tank side of the element from the first fluid, such as an inert fluid in some cases, on the divider side of the element, so that they may exchange heat alone a substantial length of the tank 102-*f*, such as the entire length of the tank 102-*f*. In effect, the system 600-*a* may be configured as layers radially from first fluid to the tank 102-*f* that may include: the first fluid, the natural convection element 128-*a*, the second fluid, and the tank wall (or side 131 as pointed out in FIG. 6B). The natural convection element 128-*a* and the divider 127-*a*, alone or in combination, may be considered a fluid introducer in some cases. When viewed separately, FIG. 6B shows system 600-*b* where the natural convection element 128-*a* may be viewed as a thin wall with larger surface area that may fit in between the divider 127-*a* and the tank wall. A header 130 may be integrated into the tank 102-*f* so the first fluid may be extracted. Holes or apertures 131 in the divider 127-*a* may allow for the first fluid, such as an inert fluid in some cases, to circulate naturally. Tank 102-*f* may include an integrated fluid inlet port(s) 161 and/or outlet port(s) 151-*a*, which may allow for the second fluid to flow through the outer portion of the tank and exchange heat with the first fluid through the natural convection element 128-*a*. In some cases, a blower, compressor, or pump (not shown) may be utilized to help draw the second fluid between inlet port(s) 161 and outlet port(s) 151-*a*. The header 130, the divider 127-*a*, and/or the convection element 128-*a*, alone or in combination, may be considered a fluid introducer in some cases. System 600-*b* may provide an example of aspects of system 100-*a* of FIG. 1A, system 100-*b* of FIG. 1B, system 500 of FIG. 5, and/or system 600-*a* of FIG. 6A, for example.

Figure 7:
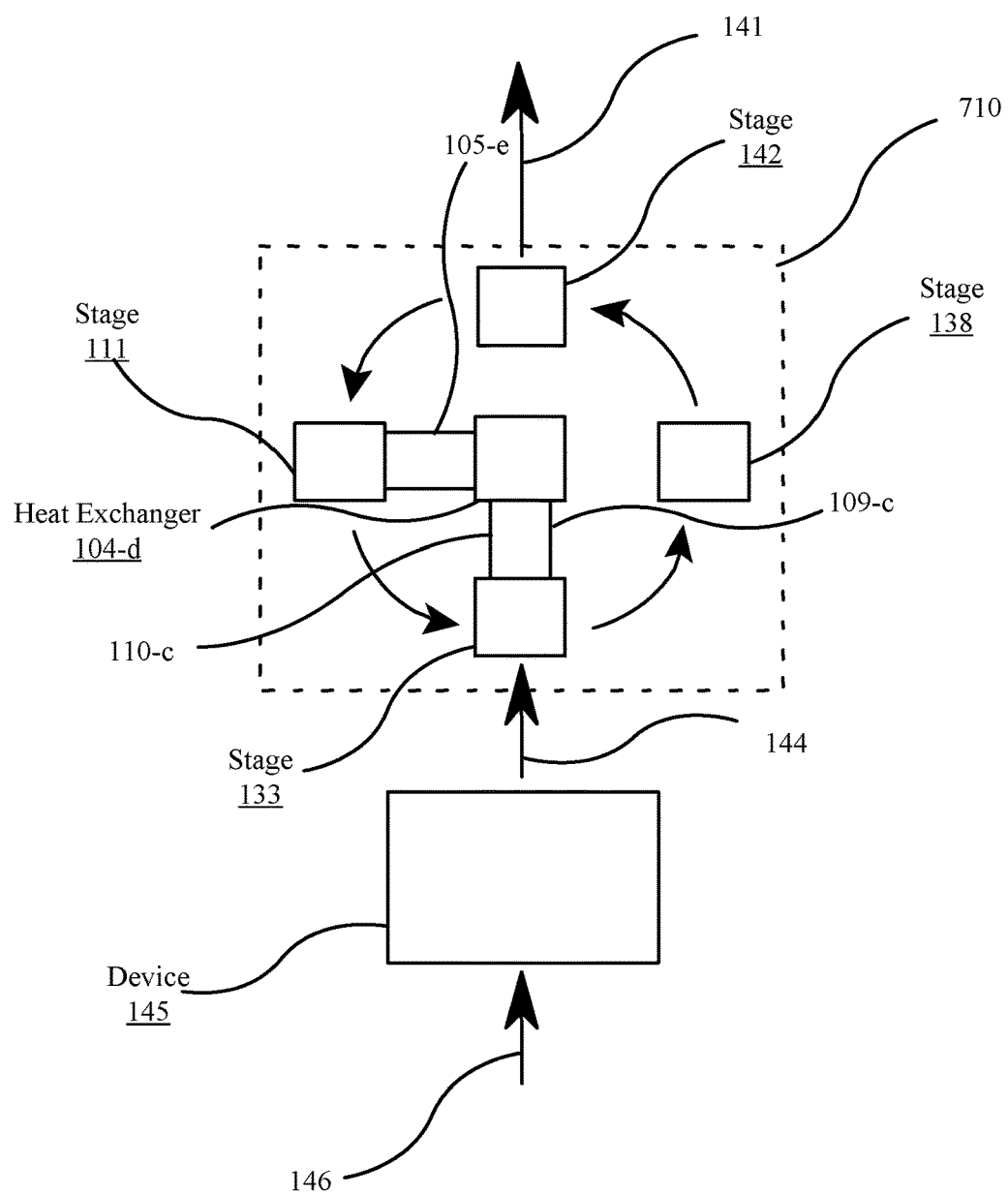
FIG. 7 shows a system for thermal recuperation in accordance with various embodiments.

Turning now to FIG. 7, a system 700 configured for thermal recuperation is provided in accordance with various embodiments. System 700 may include aspects as described with respect to system 100-*a* of FIG. 1A and/or system 100-*b* of FIG. 1B in general, for example. System 700 may utilized aspects of 200 of FIG. 2, system 300-*a* of FIG. 3A, system 300-*b* of FIG. 3B, system 400 of FIG. 4, system 500 of FIG. 5, system 600-*a* of FIG. 6A, and/or system 600-*b* of FIG. 6B.

System 700 may include a multi-stage cycle 710, which may be used to boost a device 145, for example. Some examples may utilize materials that may include a storage material and a freeze point suppressant. The storage material may include a material that may undergo a phase transition from fully or partially liquid to partially or fully solid upon cooling. The storage material may include, but is not limited to: water, an organic liquid, an ionic liquid, an inorganic liquid, or DMSO. In some cases, the term storage material may include a material that may be storing something, such as a material that may be storing the potential to heat something or the potential to cool something. The freeze point suppressant may include a pure or mixed material that may chemically suppresses the freeze point of the storage material. The freeze point suppressant may include, but is not limited to: water, ammonia, a salt, a non-salt soluble solid, an organic liquid, an inorganic liquid, a mixture of miscible materials, and/or a surfactant-stabilized mixture of immiscible materials. The device 145 may include, but is not limited to, a refrigeration device, an electrical generator (e.g., heat-engine based electrical generator, a fuel-cell based electrical generator, and/or a photovoltaic-based electrical generator), and/or a heat engine. In some cases, heat 144 may be brought into the multi-stage cycle 710, while heat 141 may be dumped out of the multi-stage cycle 710, such as to ambient. In some cases, boosting the device 145 includes absorbing heat 146.

These materials may be used in the multi-stage cycle 710, which may allow electricity to be stored for a prescribed amount of time and then used to boost the performance of a thermal-electric conversion system like a heat engine or PV panel, for example. Some embodiments may include more or less cycle stages. The stages may be performed in different orders. Some embodiments may utilize one or more stages that may not complete a cycle. An example of a multi-stage cycle, in accordance with various embodiments may include the following. The storage material may be sufficiently cooled using a chiller so as to undergo a phase transition. The freeze point suppressant may be added to the partially or fully solid material in order to lower the freeze point of the mixture. Upon mixing, the temperature of the mixture may drop due to the entropically motivated melting of the storage material. The mixture of solid storage material and freeze point suppressant may be put in thermal contact with a device 145, such a refrigeration device, an electrical generator (e.g., heat-engine based electrical generator, a fuel-cell based electrical generator, and/or a photovoltaic-based electrical generator), and/or a heat engine, in order to absorb the heat 144 from the system and boost it—this may result in boosting device 145's conversion efficiency. This absorption may result in the melting of the original substance. Using thermal, photonic, and/or pressure driven separation techniques, for example, the original substance may be separated from the freeze point suppressant in order to reset the system to its original state. This separation process may stand alone by itself, or it may "piggyback" off parallel thermal processes in the generator.

Examples that may utilize a multi-stage cycle may be dependent on the combined operation of multiple pieces of process equipment. At each stage of the cycle, there may be many options capable of producing the same result. For example, during stage 138, a multi-effect distillation system may produce the same result (separated pure storage material and freeze point suppressant) as a reverse osmosis or nano-filtration system. Examples of possible process equipment at each stage may be given herein, though other possible process equipment may be utilized.

During stage 142, a heat pump, ambient air, ambient water, or a multi-stage compression process may cool the storage material. During stage 111, a variety of mixing tanks/in-line mixers may be used. The tanks and related components of system 100-*a* of FIG. 1A, system 100-*b* of FIG. 1B, system 200 of FIG. 2, system 300-*a* of FIG. 3A, system 300-*b* of FIG. 3B, system 400 of FIG. 4, system 500 of FIG. 5, system 600-*a* of FIG. 6A, and/or system 600-*b* of FIG. 6B may be utilized for this stage in some cases. For example, a fluid introducer may be utilized to introduce a first fluid 105-*e* into a tank containing a solid, which may be an example of a fully or partially solidified storage material. This first fluid 105-*e* may be cooled by a heat exchanger 104-*d* that may be supplied with a second fluid 109-*c* that may be generated at other points in the cycle. Heat may be exchanged between the first fluid 105-*e* and the solid in the tank thus recuperating would-be wasted energy from one stage of the cycle into the solid in a useful form increasing overall energy efficiency.

During stage 133, a mixture of storage material and freeze point suppressant may enhance and/or boost device 145, which may include, but is not limited to, a refrigerator, a freezer, heat engine, fuel cell, photovoltaic panel, and/or thermionic devices. A heat exchanger 104-*d* may couple stages 133 and 111, for example. Cold fluid 109-*c*, which may be a byproduct of stage 133 and may be wasted if not recaptured, may flow through heat exchanger 104-*d*, cooling fluid 105-*e*, and may exit as a warmer fluid 110-*c* at a higher temperature; this fluid (109-*c*/110-*c*) may be referred to as a second fluid in some cases. As a byproduct of stage 133, the second fluid may include at least a portion of a combined freeze point suppressant and the storage material and may include, but is not limited to, water, alcohols, solvated salts, a volatile organic compound, an ionic liquid, amines, $CO_2$, an inorganic liquid, DMSO, and/or a mixture of miscible materials. The second fluid may result from melting of the storage material. Fluid 105-*e* may be an example of the first fluid described with respect to stage 111 in some cases. Cooled fluid 105-*e* may be recirculated through stage 111.

Aspects of stage 111 and stage 133 may represent internal cycle recuperation that may also be broadly shown in FIG. 1A, FIG. 1B, FIG. 2, and/or FIG. 5 and may represent a thermal connection internal to the cycle.

During stage 138, the mixture of storage material and freeze point suppressant may be separated by a variety of different methods including, but not limited to: reverse osmosis, nano-filtration, photonic driven precipitation, precipitation by chemical reaction, precipitation by solubility change, surfactant absorption, ion exchange, activated carbon absorption, flash separation, distillation, multi-effect distillation, vapor compression distillation, evaporation, membrane distillation, gas permeable membrane separation, liquid-liquid extraction, gas stripping, fractional distillation, and freeze distillation, among others. These systems can be stand alone or integrated directly into the operation of the enhanced generator.

Multi-stage cycles in accordance with various embodiments can be used to provide time-delayed enhancement to a wide array of electric generation systems, for example. These systems may include, but are not limited to, heat engines, fuel cells, photovoltaics, and thermionics, but are not limited to those technology types. Instead, the multi-stage cycle can be applied to any electrical generator, which may be enhanced by the presence of a colder thermal sink then ambient temperature. Multi-stage cycles in accordance with various embodiments may be used to provide for cooling and/or freezing for refrigeration and/or freezer devices.

The thermal interface between the multi-stage cycle and the generator, for example, can take different forms depending on the type of storage material, freeze point suppressant, and/or generator used. This interface can be as simple as a direct thermal coupling through a direct or indirect heat exchanger, or it can be a more complicated connection. For example, the storage material or freeze point suppressant may be a material that is also used in the generator as a heat transfer fluid or working fluid. The storage material or freeze point suppressant may intimately interact with the turbo machinery of the generator and the separation of the storage material and freeze point suppressant may be a natural result of the operation of the generator.

The energy source for device 145 may be independent of the multi-stage cycle described here. It may include, but is not limited to: waste heat from an industrial process; waste heat from a separate energy generator; chemical fuel from a virgin or waste source; or solar sources.

Figure 8A:
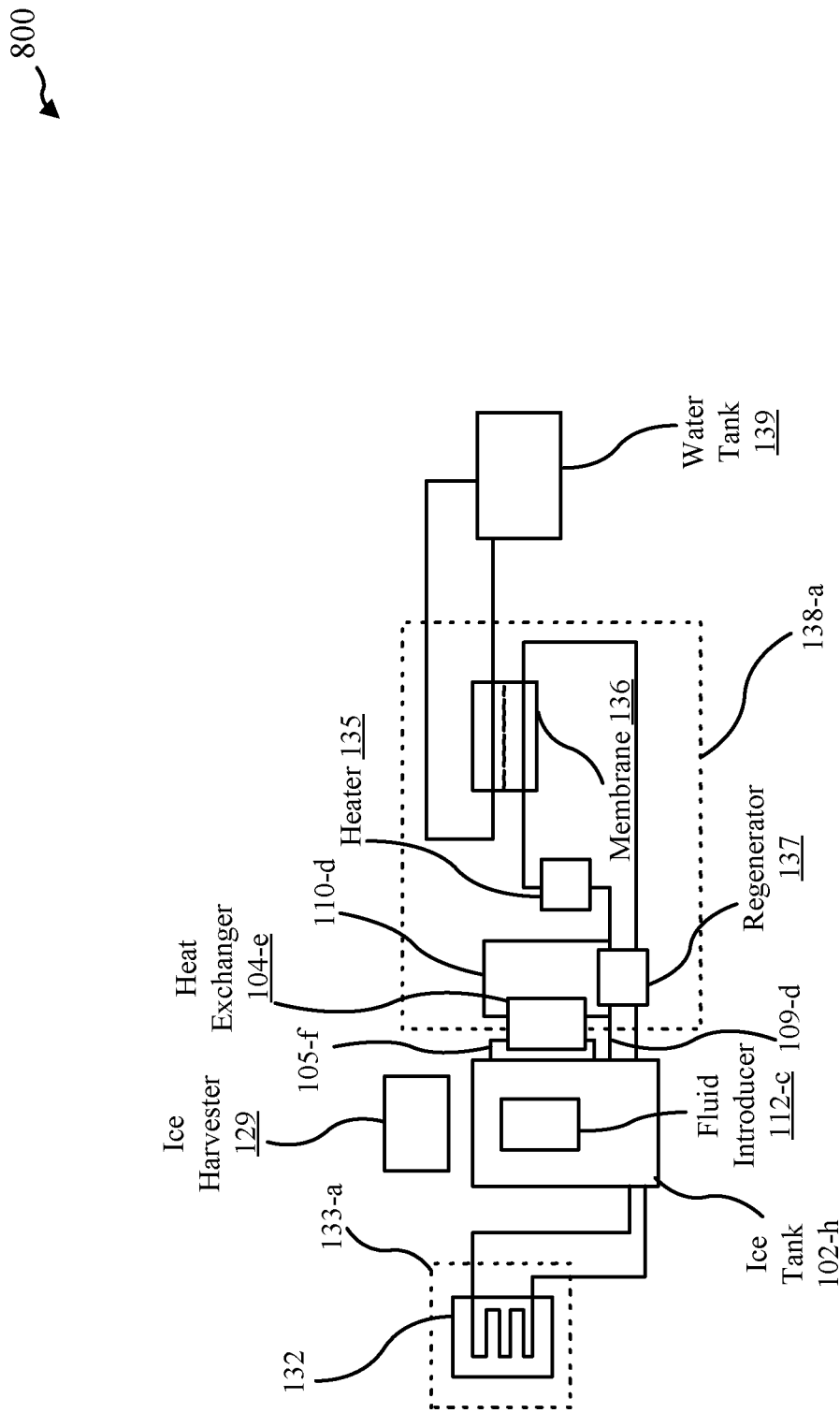
FIG. 8A shows a system for thermal recuperation in accordance with various embodiments.
Figure 8B:
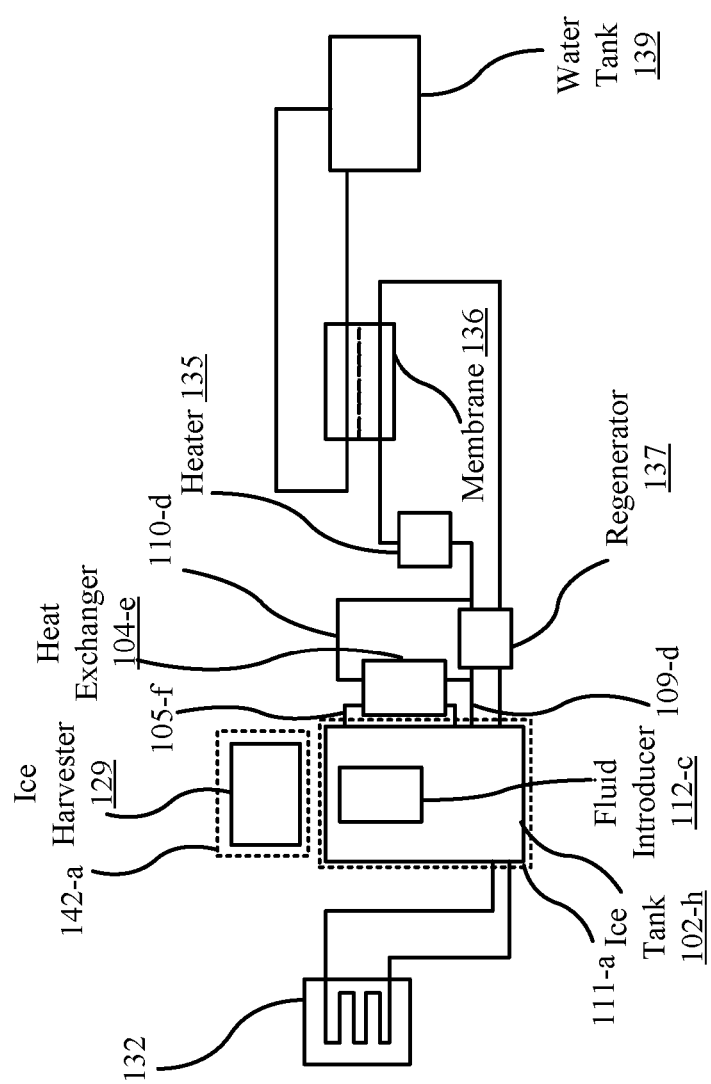
FIG. 8B shows a system for thermal recuperation in accordance with various embodiments.

Turning now to FIG. 8A and FIG. 8B, a system 800 for thermal recuperation is provided in accordance with various embodiments. System 800 may be an example of system 700 of FIG. 7, for example. System 800 may utilize aspects from the system 100-*a* of FIG. 1A, system 100-*b* of FIG. 1B, system 200 of FIG. 2, system 300-*a* of FIG. 3A, system 300-*b* of FIG. 3B, system 400 of FIG. 4, system 500 of FIG. 5, system 600-*a* of FIG. 6A, and/or system 600-*b* of FIG. 6B. FIG. 8A may show the system 800 in a discharge phase and/or boost phase. FIG. 8B may show the system 800 in a charge phase. System 800 may utilize a variant of storage materials, freeze point suppressants, devices, energy sources, and/or freeze point suppressant-storage material separation methods. One example may utilize the following: storage material-water; freeze point suppressant-ionic material; device-freezer; energy source-electricity; and/or freeze point suppressant-storage material separation-hydrophobic gas permeable membrane. This example may use water as the storage material and an ionic material as the freeze point suppressant, for example. The 4-stage cycle may boost the output of a freezer as to avoid the purchase of electricity, for example. While system 800 may be described utilizing specific storage materials, freeze point suppressants, devices, energy sources, and/or freeze point suppressant-storage material separation techniques, this may be for clarity purposes and other storage materials, freeze point suppressants, devices, energy sources, and/or separation techniques may be utilized in some examples, such as those described with respect to system 700 of FIG. 7.

At stage 142-a, water may be frozen by an ice harvester 129. The frozen water may be stored for a prescribed amount of time in the ice tank 102-h with minimal melting, in some cases. In some examples, the water may be pure. The frozen water may be an example of a solid as referred to with respect to system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, and/or system 700 of FIG. 7. The ice tank 102-h may be an example of tank 102 of system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, and/or system 700 of FIG. 7. In some cases, the frozen water may be fully or partially solid.

At stage 111-a, a first fluid may introduced into ice tank 102-h utilizing a fluid introducer 112-c. The first fluid may be air in some cases. The first fluid may include inert fluids in general, including, but not limited to, water, synthetic oil, natural oil, air, nitrogen, argon, and/or carbon dioxide. The fluid introducer 112-c may be an example of the fluid introducers as described with respect to system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, and/or system 700 of FIG. 7. The first fluid may pass around or through the ice or solid, in general, exchanging heat between the ice and the first fluid.

In some cases, in the ice tank 102-h, the ice or other solid in tank may be mixed with an ionic material suppressing its freeze point. The ice may be entropically melted until it may reach an equilibrium point with the freeze point suppressant. Given the presence of the first fluid cooling the solid to a low temperature, this entropic melting may be minimized as the solid may be closer to the equilibrium point before mixing begins. This may lead to higher system efficiency. The freeze point suppressant concentration may be managed actively by a system described in stage 138-a.

In some cases, the first fluid may pass around or through the ice before the ice may be mixed with a freeze point suppressant. In some cases, the ice and freeze point suppressant may be mixed after the ice moves into and/or through the bottom portion of tank 102-h.

At stage 133-a, the storage material-freeze point suppressant mixture may be used to cool the environment inside a freezer 132 so that no electricity may be used, for example.

At stage 138-a, after cooling the freezer 132, a portion of the mixture may be run through a regenerative heat exchanger 137, which may heat it to ambient temperature. The mixture may then be run into a heater 135, where it may be heated to a separation temperature. It then may be run through a gas permeable hydrophobic membrane 136, where water vapor may be extracted and the brine may be concentrated. The water vapor may be condensed and stored in the water tank 139. Regenerator 137, heater 135, and/or membrane 136 may be examples of one or more aspects of a separator.

In system 800, a heat exchanger 104-e may couple stages 133-a and 111-a, for example. Heat exchanger 104-e may be example of the heat exchangers 104 of system 100-a of FIG. 1A, system 100-b of FIG. 1B, system 200 of FIG. 2, system 300-b of FIG. 3B, system 500 of FIG. 5, system 600-a of FIG. 6B, system 600-b of FIG. 6B, and/or system 700 of FIG. 7. Cold fluid 109-d may be separated from the flow before the regenerative heat exchanger 137 and may instead run through heat exchanger 104-e, cooling fluid 105-f, and may exit as a warmer fluid 110-d at a higher temperature, where it may then flow to the heater 135; this fluid may be referred to as a second fluid in some cases. Fluid 105-f may be an example of the first fluid as described with respect to stage 111-a. In some cases, fluid 105-f, after being cooled, may be recirculated through tank 102-h and the solid contained within the tank. Cold fluid 109-d may come from the storage material-freeze point suppressant mixture.

One skilled in the art will recognize that other systems in analogy with system 800 may be constructed utilizing the system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, and/or system 700 of FIG. 7.

Figure 9A:
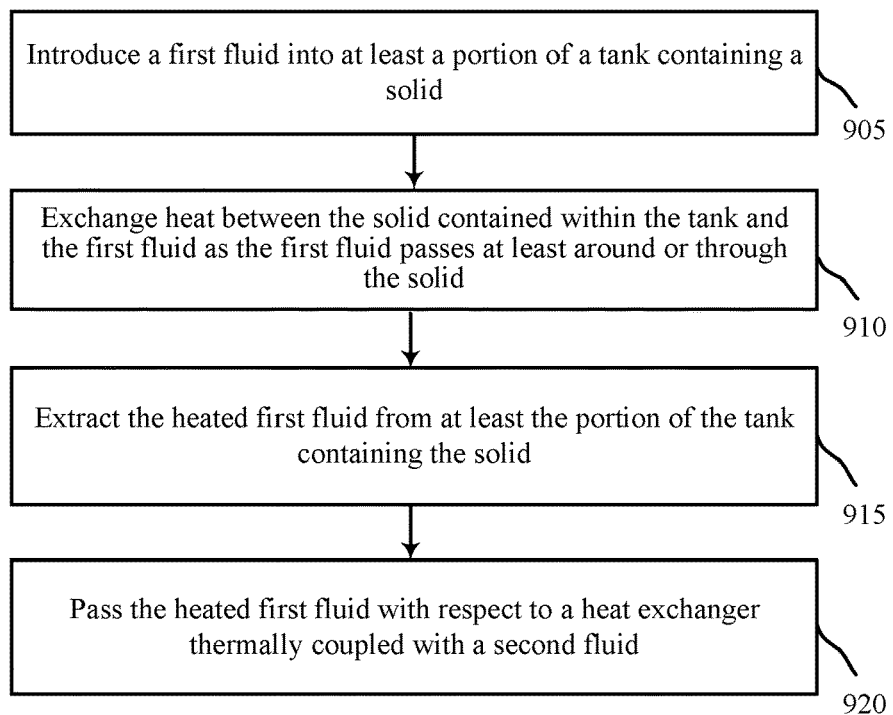
FIG. 9A shows a method for thermal recuperation in accordance with various embodiments.

FIG. 9A shows a flow diagram of a method 900 of thermal recuperation in accordance with various embodiments. Method 900 may be implemented utilizing systems as those shown in system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, system 700 of FIG. 7, and/or system 800 of FIG. 8A and FIG. 8B.

At block 905, a first fluid may be introduced into at least a portion of a tank containing a solid. At block 910, heat may be exchanged between the solid contained within the tank and the first fluid as the first fluid passes at least around or through the solid. At block 915, the heated first fluid may be extracted from at least the portion of the tank containing the solid. At block 920, the heated first fluid may be passed with respect to a heat exchanger thermally coupled with a second fluid. The heated first fluid may be cooled as it passes with respect to the heat exchanger and heat is thermally recuperated between the solid and the second fluid.

Some examples of the method 900 may include recirculating the cooled first fluid through the tank after it has passed with respect to the heat exchanger. The method 900 may include moving at least a portion of the solid through a lower portion of the tank after the first fluid has passed at least around or through the solid. Moving at least the portion of the solid through the lower portion of the tank may utilize gravity. Some examples of the method 900 include combining at least a portion of the solid with a freeze point suppressant after moving at least the portion of the solid through the lower portion after the tank; combining at least the portion of the solid with the freeze point suppressant may produce the second fluid, which may occur through melting of the solid, for example.

In some examples of the method 900, introducing the first fluid into the tank containing the solid may include utilizing one or more vertically-oriented injectors. The method 900 may further include utilizing at least a pump, a compressor, or a blower to facilitate at least the introducing or the extracting in some cases.

In some examples of the method 900, introducing the first fluid into the tank containing the solid may include utilizing the heat exchanger to generate buoyancy forces with respect to the first fluid. The method 900 may further include utilizing one or more dividers within the tank to separate the solid from the heat exchanger.

In some examples of the method 900, the first fluid may include an inert fluid. The inert fluid may include at least an inert liquid or an inert gas. The inert fluid may include at least water, synthetic oil, natural oil, air, nitrogen, argon, and/or carbon dioxide in some cases. In one example, the inert fluid may include air and the solid may include ice.

In some examples of the method 900, the solid may include a phase-transitioned material. The second fluid may include at least a portion of a combined freeze point suppressant and the phase-transitioned material.

Figure 9B:
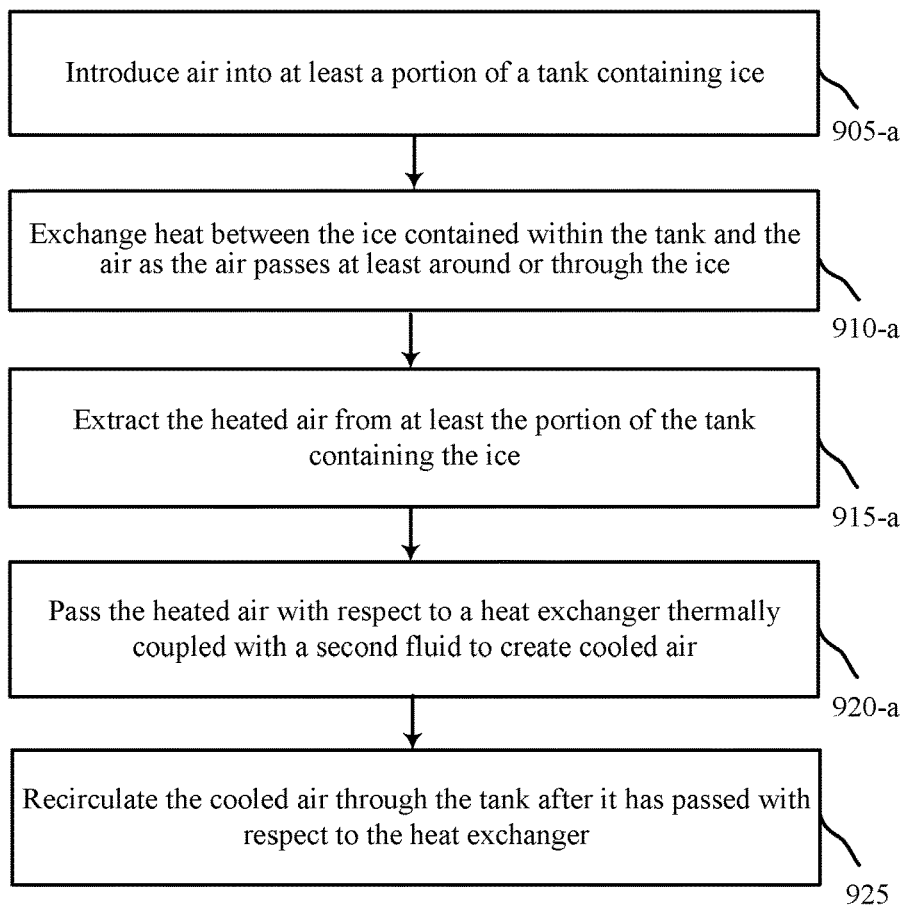
FIG. 9B shows a method for thermal recuperation in accordance with various embodiments.

FIG. 9B shows a flow diagram of a method 900-a of thermal recuperation in accordance with various embodiments. Method 900-a may be implemented utilizing systems as those shown in system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, system 700 of FIG. 7, and/or system 800 of FIG. 8A and FIG. 8B.

At block 905-a, air or another inert fluid may be introduced into at least a portion of a tank containing ice. At block 910-a, heat may be exchanged between the ice contained within the tank and the air as the air passes at least around or through the ice. At block 915-a, the heated air may be extracted from at least the portion of the tank containing the ice. At block 920-a, the heated air may be passed with respect to a heat exchanger thermally coupled with a second fluid. The heated air may be cooled as it passes with respect to the heat exchanger and heat may be thermally recuperated between the ice and the second fluid. At block 925, the cooled air may be recirculated through the tank after it has passed with respect to the heat exchanger.

Figure 9C:
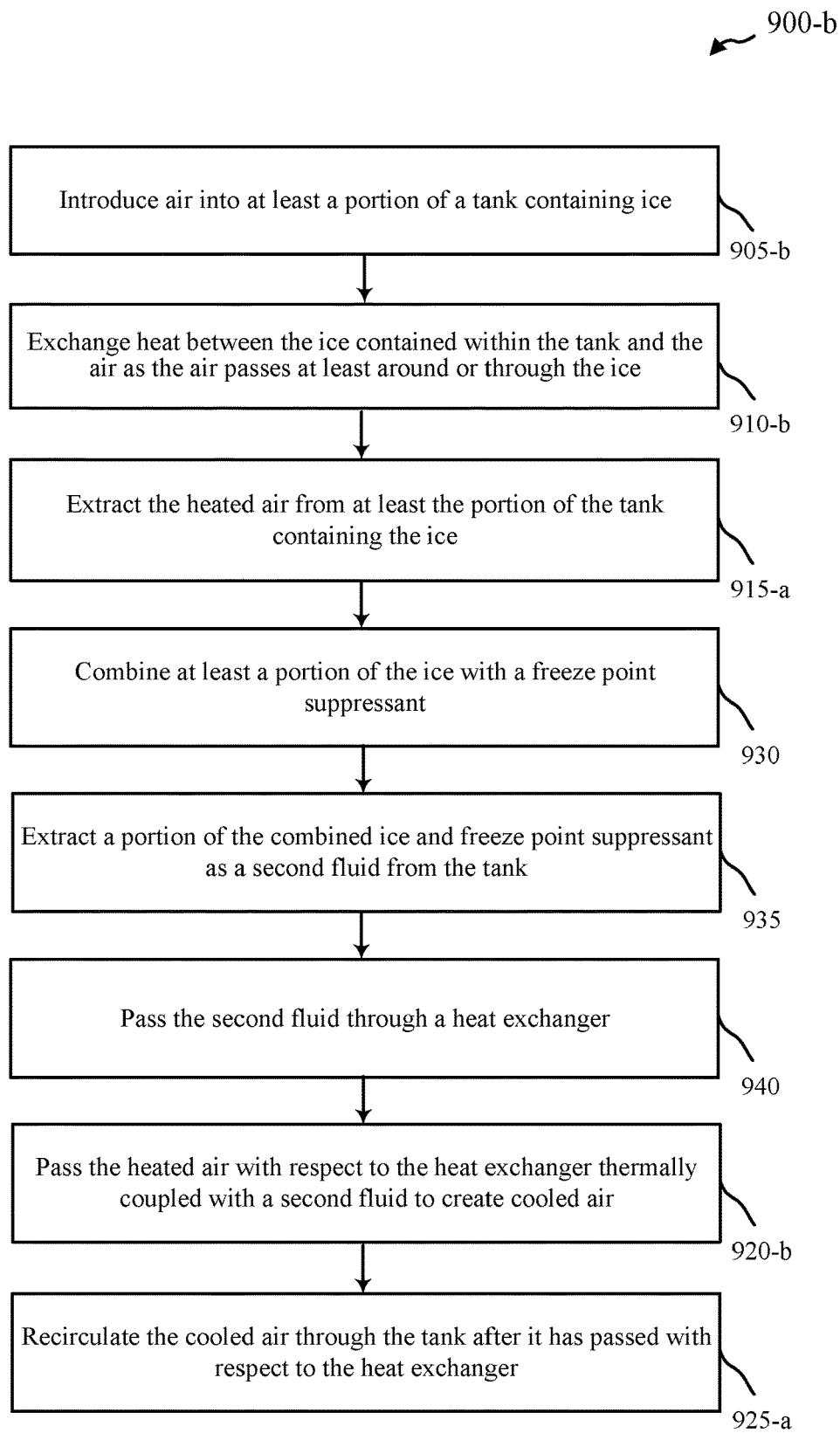
FIG. 9C shows a method for thermal recuperation in accordance with various embodiments.

FIG. 9C shows a flow diagram of a method 900-b of thermal recuperation in accordance with various embodiments. Method 900-b may be implemented utilizing systems as those shown in system 100-a of FIG. 1A, system 100-b of FIG. 1B, system 200 of FIG. 2, system 300-a of FIG. 3A, system 300-b of FIG. 3B, system 400 of FIG. 4, system 500 of FIG. 5, system 600-a of FIG. 6A, system 600-b of FIG. 6B, system 700 of FIG. 7, and/or system 800 of FIG. 8A and FIG. 8B.

At block 905-b, air or another inert fluid may be introduced into at least a portion of a tank containing ice. At block 910-b, heat may be exchanged between the ice contained within the tank and the air as the air passes at least around or through the ice. At block 915-a, the heated air may be extracted from at least the portion of the tank containing the ice. At block 930, at least a portion of the ice may be combined with a freeze point suppressant; this may occur in a lower portion of the tank in some cases. At block 935, a portion of the combined ice and freeze point suppressant may be extracted as a second fluid from the tank. At block 940, the second fluid may be passed through a heat exchanger. At block 920-b, the heated air from the tank may be passed with respect to the heat exchanger thermally coupled with the second fluid. The heated air may be cooled as it passes with respect to the heat exchanger and heat may be thermally recuperated between the ice and the second fluid. At block 925-a, the cooled air may be recirculated through the tank containing ice after the cooled air has passed with respect to the heat exchanger.

These embodiments may not capture the full extent of combination and permutations of materials and process equipment. However, they may demonstrate the range of applicability of the method, devices, and/or systems. The different embodiments may utilize more or less stages than those described. The different embodiments may also utilize aspects of each other. In each of these embodiments, the heat engines may be replaced by fuel cells or other systems enhanced by the presence of very cold materials, for example. The boosting techniques in general may be utilized with different thermodynamic systems and/or devices. Furthermore, each embodiment can work with a large array of heat engines running of a large array of energy sources.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of stages may be undertaken before, during, or after the above elements are considered. Accordingly, the above description should not be taken as limiting the scope of the invention.

The invention claimed is:

1. A method of thermally recuperating heat comprising:
   introducing a first fluid into a portion of a tank containing ice, wherein the first fluid passes through a vertically-oriented injector positioned within the tank containing the ice to introduce the first fluid into the tank containing the ice;
   exchanging heat between the ice contained within the tank and the first fluid as the first fluid makes direct contact with the ice and moves up through the tank containing the ice;
   extracting the first fluid from the tank containing the ice;
   melting at least a portion of the ice through combining at least the portion of the ice with a freeze point suppressant in a portion of the tank containing the portion of ice to produce a second fluid after the first fluid makes direct contact with the portion of the ice; and passing the first fluid, after being extracted from the tank containing the ice, through a heat exchanger thermally coupled with the second fluid, wherein the first fluid is cooled as it passes through the heat exchanger.

2. The method of claim 1, further comprising recirculating the first fluid through the tank after it has passed with respect to the heat exchanger.

3. The method of claim 1, further comprising utilizing at least a pump, a compressor, or a blower to facilitate at least the introducing or the extracting of the first fluid.

4. The method of claim 1, wherein the first fluid comprises an inert fluid.

5. The method of claim 4, wherein the inert fluid comprises air.

6. The method of claim 1, wherein exchanging heat between the ice contained within the tank and the first fluid as the first fluid makes direct contact with the ice heats the first fluid.

7. The method of claim 1, wherein the heat exchanger thermally coupled with the second fluid is configured such that the second fluid passes through the heat exchanger.

\* \* \* \* \*